No. 890,184. PATENTED JUNE 9, 1908.
S. SEITNER, Jr.
HARROW ATTACHMENT FOR PLOWS.
APPLICATION FILED FEB. 14, 1907.
Fig-1-
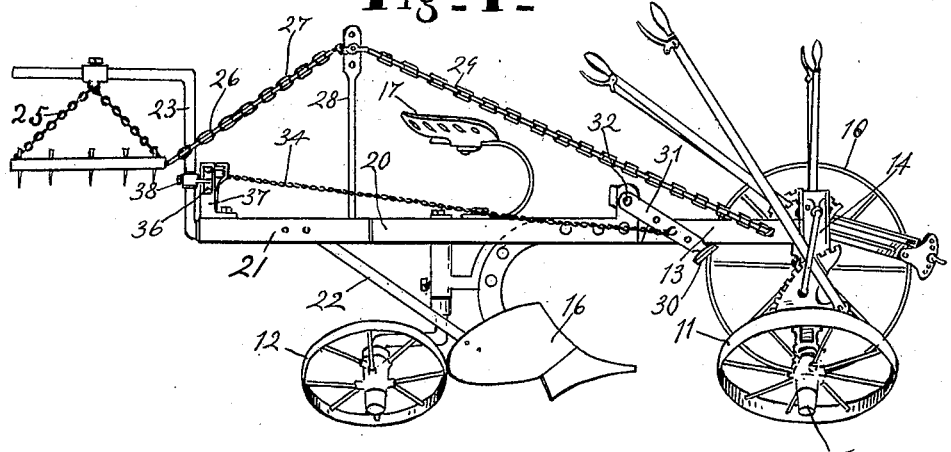
Fig-2-
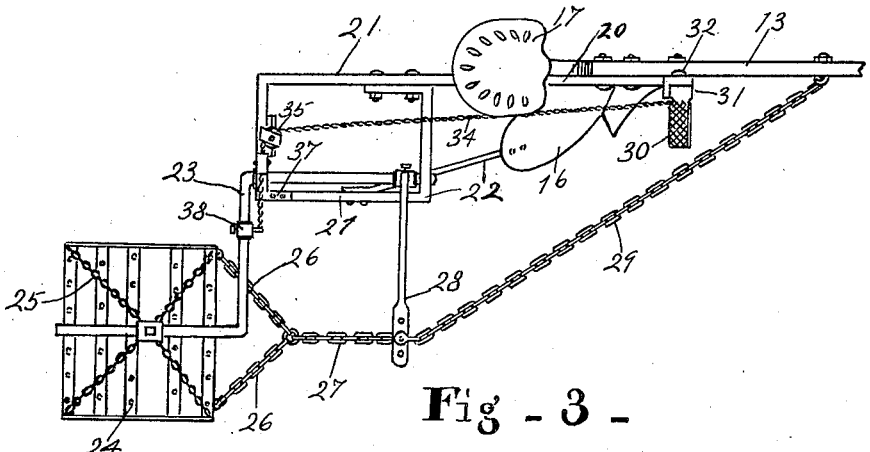
Fig-3-
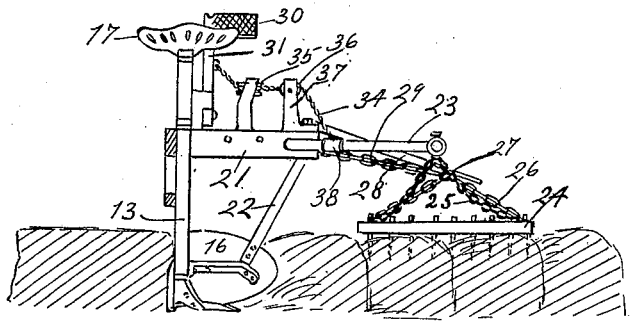
WITNESSES:
W. M. Gentte.
N. Allemong.
INVENTOR.
Samuel Seitner, Jr.
BY
V. H. Lockwood
ATTORNEY

UNITED STATES PATENT OFFICE.

SAMUEL SEITNER, JR., OF ROANN, INDIANA.

HARROW ATTACHMENT FOR PLOWS.

No. 890,184.

Specification of Letters Patent.

Patented June 9, 1908.

Application filed February 14, 1907. Serial No. 357,388.

*To all whom it may concern:*

Be it known that I, SAMUEL SEITNER, Jr., of Roann, county of Wabash, and State of Indiana, have invented a certain new and useful Harrow Attachment for Plows; and I do hereby declare that the following is a full, clear, and exact description thereof, reference being had to the accompanying drawings, in which like letters refer to like parts.

The object of this invention is to provide an improved harrow attachment for breaking plows whereby the ground will be harrowed as it is plowed and by the same team and man.

The nature of this invention will be understood from the accompanying drawings and the following description and claims.

In the drawings, Figure 1 is a side elevation of the plow and harrow combined with the harrow in its elevated position. Fig. 2 is a plan view of the plow while in use with the wheels and some other parts omitted. Fig. 3 is a rear elevation of the device shown in Fig. 2 and a section of the ground being plowed.

The construction herein shown to illustrate the general nature of my invention consists of a sulky plow with a harrow attachment combined therewith. However, I do not wish the invention to be limited to a sulky plow as it may be used in connection with a walking plow.

The sulky plow has the front wheels 10 and 11 and rear furrow wheel 12, the latter swiveled in connection with the plow beam 13 which at its forward end is mounted in connection with the frame 14 on the axle 15. The plow 16 is fastened to the beam 13 on the turned down rear end thereof, and the said beam carries a seat 17. No invention is intended to be claimed in any of the foregoing parts of the plow construction.

To the side of the beam 13 on which is the mold-board 16 is secured a bar 20 that extends rearward for some distance behind the plow and seat and at its rear end a rectangular frame 21 is secured that extends laterally on the same side as the mold board. As shown herein the frame 21 is a rectangular extension of the bar 20, but they need not be integral but are rigidly connected. A brace 22 runs from the mold-board to the outer side of said rectangular frame 21 for supporting the latter in its horizontal position. In said frame 21 a crank-shaft 23 is rotatably mounted. This shaft consists of three parts, one part being mounted in the frame 21, and it is parallel with the bar 20. The middle part of the crank-shaft is turned at a right angle therefrom and the rear end of the shaft is again turned at a right angle from the middle part and on a line parallel with a line through the first part of said shaft, as appears in Fig. 2. A harrow 24 is mounted in connection with the rear end of the crank-shaft 23. This connection may be by any suitable means, that shown being chains 25. From the front end of the harrow two chains 26 extend that unite in a single chain 27 which is fastened to the outer end of an arm 28 extending outwardly at a right angle from the mounted end of the crank-shaft 23 and secured thereto rigidly. A stay-chain 29 extends from the outer end of the arm 28 to the forward part of the beam 13. This construction supports the harrow in its two positions and holds it out to the side of the plow as shown in Fig. 3. The harrow is preferably about twice as wide as the plow so that it will harrow the ground twice, once each round.

The harrow is elevated and lowered to its positions of use and disuse by the pedal 30 on the lever 31 fulcrumed to the stand 32 at the inner end of the bar 20. A chain 34 extends from the lever 31 rearward about a pair of pulleys 35 and 36 on the stand 37 that is secured to the frame 21. The chain is connected with the middle member of the crank-shaft 23 at the point 38. This attachment 38 is adjustable by a set-screw so that the leverage may be made as desired and likewise the attachment of the chain 34 to the lever 31 is adjustable.

What I claim as my invention and desire to secure by Letters Patent is:

1. The combination with a plow, of a frame, a crank shaft with one portion mounted in said frame longitudinally thereof and extending rearwardly therefrom and with another portion extending laterally from the rear end of said longitudinal portion, a harrow suspended from the laterally extending portion of the shaft, and a pedal operated means connected with said frame for turning said harrow supporting portion from a horizontal to a vertical position behind said frame.

2. The combination with a plow, of a bar secured to the beam thereof and extending rearward, a laterally extending frame at the rear end of said bar, a crank-shaft mounted in the outer end of said frame, a harrow supported by the rear end of said crank shaft, a pedal mounted on the forward end of said bar, pulleys on said frame, and a chain running from the pedal over said pulleys to the crank-shaft for elevating and lowering the harrow.

3. The combination with a plow, of a bar secured to the beam thereof and extending rearward, a laterally extending frame at the rear end of said bar, a crank-shaft mounted in the outer end of said frame, a harrow supported by the rear end of said crank-shaft, a pedal mounted on the forward end of said bar, pulleys on said frame, a chain running from a pedal over said pulleys to the crank-shaft for elevating and lowering it, an arm extending laterally from the forward end of said crank-shaft, a chain connection between the outer end of the arm and the harrow and between the outer end of said arm and forward part of the plow beam.

In witness whereof, I have hereunto affixed my signature in the presence of the witnesses herein named.

SAMUEL SEITNER, Jr.

Witnesses:
CHAS. H. BROWER,
ROSCOE RICHARDSON.